United States Patent
Patil et al.

(10) Patent No.: US 10,334,552 B2
(45) Date of Patent: Jun. 25, 2019

(54) ENABLING DEVICE-TO-DEVICE DISCOVERY

(71) Applicant: QUALCOMM Incorporated, San Diego, CA (US)

(72) Inventors: Shailesh Patil, Raritan, NJ (US); Saurabha Rangrao Tavildar, Jersey City, NJ (US); Sudhir Kumar Baghel, Bridgewater, NJ (US); Kapil Gulati, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/589,634

(22) Filed: May 8, 2017

(65) Prior Publication Data
US 2017/0245134 A1    Aug. 24, 2017

Related U.S. Application Data

(62) Division of application No. 15/061,263, filed on Mar. 4, 2016, now Pat. No. 9,668,232.

(Continued)

(51) Int. Cl.
| | |
|---|---|
| H04W 4/00 | (2018.01) |
| H04W 60/00 | (2009.01) |
| H04W 76/14 | (2018.01) |
| H04W 8/00 | (2009.01) |
| H04W 72/04 | (2009.01) |
| H04W 88/02 | (2009.01) |

(52) U.S. Cl.
CPC ......... *H04W 60/005* (2013.01); *H04W 8/005* (2013.01); *H04W 72/0453* (2013.01); *H04W 76/14* (2018.02); *H04W 88/02* (2013.01)

(58) Field of Classification Search
CPC .. H04W 8/005; H04W 72/453; H04W 76/023
See application file for complete search history.

(56) References Cited

U.S. PATENT DOCUMENTS

| | | |
|---|---|---|
| 9,668,232 B2 | 5/2017 | Patil et al. |
| 2009/0013081 A1 | 1/2009 | Laroia et al. |

(Continued)

FOREIGN PATENT DOCUMENTS

WO   WO-2013172755 A1   11/2013

OTHER PUBLICATIONS

Alcatel-Lucent et al., "Discovery Monitoring for a Single Receiver UE," 3GPP TSG-RAN WG2 Meeting #87, R2-143608, Dresden, Germany, Aug. 18-22, 2014, 4 pgs., XP050819760, 3rd Generation Partnership Project.

(Continued)

*Primary Examiner* — Stephen M D Agosta
(74) *Attorney, Agent, or Firm* — Holland & Hart LLP

(57) ABSTRACT

Methods, systems, and devices are describe for signaling protocols for device-to-device discovery operations in a wireless communication system. A user equipment (UE) may be communicating with a serving base station using a first frequency in a first frequency band. The UE may transmit, to the serving base station, information associated with performing a discovery scan procedure on a second frequency in a second frequency band during a discovery scan interval. The first frequency may be different from the second frequency. The UE may identify a capability to skip one or more downlink transmissions from the serving base station during the discovery scan interval.

16 Claims, 14 Drawing Sheets

Related U.S. Application Data

(60) Provisional application No. 62/142,969, filed on Apr. 3, 2015.

(56) References Cited

U.S. PATENT DOCUMENTS

| | | |
|---|---|---|
| 2009/0117891 A1 | 5/2009 | Chou |
| 2010/0085941 A1 | 4/2010 | Chin et al. |
| 2012/0238274 A1 | 9/2012 | Kodama et al. |
| 2012/0243433 A1 | 9/2012 | Kneckt et al. |
| 2013/0148566 A1 | 6/2013 | Doppler et al. |
| 2013/0183963 A1 | 7/2013 | Turtinen et al. |
| 2014/0003262 A1 | 1/2014 | He et al. |
| 2014/0036793 A1 | 2/2014 | Johnsson et al. |
| 2014/0056220 A1 | 2/2014 | Poitau et al. |
| 2014/0112194 A1 | 4/2014 | Novlan et al. |
| 2015/0045017 A1 | 2/2015 | Patil et al. |
| 2016/0295542 A1 | 10/2016 | Patil et al. |

OTHER PUBLICATIONS

Huawei et al., "Discussion on D2D Discovery Monitoring," 3GPP TSG RAN WG2 Meeting #87, R2-143449, Dresden, Germany, Aug. 18-22, 2014, 3 pgs., XP050794468, 3rd Generation Partnership Project.

ISA/EP, International Search Report and Written Opinion of the International Searching Authority, Int'l Application No. PCT/US2016/021256, dated Jun. 13, 2016, European Patent Office, Rijswijk, NL, 24 pgs.

Qualcomm Incorporated, "Inter-Frequency and PLMN Discovery," 3GPP TSG-RAN WG2 Meeting #89Bis, R2-151511, Bratislava, Slovakia, Apr. 20-24, 2015, 3 pgs., XP050953147, 3rd Generation Partnership Project.

Samsung, "Discovery Monitoring in RRC Connected State," 3GPP TSG RAN WG2 Meeting #87, R2-143265, Dresden, Germany, Aug. 18-22, 2014, 4 pgs., XP050794338, 3rd Generation Partnership Project.

ENABLING DEVICE-TO-DEVICE DISCOVERY

CROSS REFERENCES

The present Application for Patent is a divisional of U.S. patent application Ser. No. 15/061,263 by Patil et al., entitled "ENABLING DEVICE-DEVICE DISCOVERY," filed Mar. 4, 2016, and claims priority to U.S. Provisional Patent Application No. 62/142,969 by Patil et al., entitled "ENABLING DEVICE-TO-DEVICE DISCOVERY," filed Apr. 3, 2015, assigned to the assignee hereof, and expressly incorporated by reference herein.

BACKGROUND

Field of the Disclosure

The present disclosure, for example, relates to wireless communication systems, and more particularly to enabling a device-to-device discovery procedure.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Typically, UEs engage in wireless communication by communicating with a base station of a wireless communications system. However, UEs may also participate in direct D2D or ProSe wireless communications. D2D discovery allows UEs that are within range of each other to communicate directly with each other instead of communicating through a base station. One UE may broadcast a D2D discovery announcement, such as a Direct Peer-Discovery Signal in a Long Term Evolution (LTE) system, which may then be received by the neighboring UEs in the proximity that are monitoring such discovery communications. A monitoring UE may receive the D2D discovery announcement and perform an association procedure to authenticate and establish communications with the announcing UE. Such discovery procedures, however, become problematic when the announcing UE and the monitoring UE are operating on different frequencies and, in some situations, via different carriers. For example, a monitoring UE that is camped on and communicating with a serving base station may need to tune to the frequency of the announcing UE to detect the discovery signal, which may disrupt communications with the serving base station.

SUMMARY

The described features generally relate to one or more improved methods, systems, devices, or apparatuses that enable D2D discovery procedures. Generally, the improved methods may provide for a monitoring UE to perform a discovery procedure with an announcing UE while in an active communication session with a serving base station. The announcing UE may communicate using a different frequency than the frequency used for communications with the monitoring UE and the serving base station, which may result in the monitoring UE skipping certain downlink transmissions during the discovery scan procedure. For example, the monitoring UE may be in an active communication session with the serving base station using a first frequency in a first frequency band. The monitoring UE may send to the serving base station information associated with performing a discovery scan procedure on a second frequency in a second frequency band during a discovery scan interval. The first and second frequencies may be different. The monitoring UE may identify (autonomously and/or based on information received from the serving base station) a capability to skip at least a portion of downlink transmissions from the serving base station during the discovery scan interval. Accordingly, the monitoring UE may be able to inform the serving base station about an intention, desire, etc., to perform an inter-frequency and, in some cases, inter-carrier, discovery scan that may result in skipping certain downlink transmissions from the serving base station.

In a first illustrative set of examples, a method for wireless communication at a user equipment (UE) is provided. The method may include: communicating with a serving base station using a first frequency in a first frequency band; transmitting, to the serving base station, information associated with performing a discovery scan procedure on a second frequency in a second frequency band during a discovery scan interval, the second frequency being different from the first frequency; and identifying a capability to skip one or more downlink transmissions from the serving base station during the discovery scan interval.

In some aspects, the method may include tuning to the second frequency during the discovery scan interval; and skipping the one or more downlink transmissions from the serving base station during the discovery scan interval. The method may include receiving a response from the serving base station; and skipping at least a portion of the one or more downlink transmissions from the serving base station during the discovery scan interval based at least in part on the received response. The response may include permission to skip the at least a portion of the one or more downlink transmissions from the serving base station during the discovery scan interval.

In some aspects, the method may include skipping a first portion of the one or more downlink transmissions from the serving base station during the discovery scan interval based at least in part on the received response; and receiving a second portion of the one or more downlink transmissions from the serving base station during the discovery scan interval based at least in part on the received response. The response may include a bitmap associated with the one or more downlink transmissions from the serving base station, the bitmap identifying a first portion of the one or more downlink transmissions the UE is allowed to skip and a second portion the one or more downlink transmissions the UE is not allowed to skip.

In some aspects, the method may include sending timing information associated with the discovery scan interval to the serving base station. The timing information may include an identification of one or more sub-frames where the UE skips the one or more downlink transmissions from the serving base station. The method may include selecting the one or more sub-frames based on a timing difference between the serving base station and another device transmitting the discovery signal associated with the discovery scan procedure. The method may include determining a timing parameter associated with tuning to and tuning away from the second frequency band; and selecting the one or more sub-frames to account for the timing parameter.

In some aspects, the serving base station may be associated with a first network and the discovery scan procedure may be associated with a second network, the first network being different from the second network. The discovery scan procedure may be a device-to-device discovery procedure.

In a second illustrative set of examples, an apparatus for wireless communication is provided. The apparatus may include: a processor; memory in electronic communication with the processor; and instructions stored in the memory, the instructions being executable by the processor to: communicate with a serving base station using a first frequency in a first frequency band; transmit, to the serving base station, information associated with performing a discovery scan procedure on a second frequency in a second frequency band during a discovery scan interval, the second frequency being different from the first frequency; and identify a capability to skip one or more downlink transmissions from the serving base station during the discovery scan interval.

In some aspects, the apparatus may include instructions executable by the processor to: tune to the second frequency during the discovery scan interval; and skip the one or more downlink transmissions from the serving base station during the discovery scan interval. The apparatus may include instructions executable by the processor to: receive a response from the serving base station; and skip at least a portion of the one or more downlink transmissions from the serving base station during the discovery scan interval based at least in part on the received response. The response may include permission to skip the at least a portion of the one or more downlink transmissions from the serving base station during the discovery scan interval.

In some aspects, the apparatus may include instructions executable by the processor to: skip a first portion of the one or more downlink transmissions from the serving base station during the discovery scan interval based at least in part on the received response; and receive a second portion of the one or more downlink transmissions from the serving base station during the discovery scan interval based at least in part on the received response. The response may include a bitmap associated with the one or more downlink transmissions from the serving base station, the bitmap identifying a first portion of the one or more downlink transmissions the UE is allowed to skip and a second portion the one or more downlink transmissions the UE is not allowed to skip.

In some aspects, the apparatus may include instructions executable by the processor to send timing information associated with the discovery scan interval to the serving base station. The timing information may include an identification of one or more sub-frames where the UE skips the one or more downlink transmissions from the serving base station. The apparatus may include instructions executable by the processor to select the one or more sub-frames based on a timing difference between the serving base station and another device transmitting the discovery signal associated with the discovery scan procedure. The apparatus may include instructions executable by the processor to: determine a timing parameter associated with tuning to and tuning away from the second frequency band; and select the one or more sub-frames to account for the timing parameter.

In some aspects, the serving base station may be associated with a first network and the discovery scan procedure may be associated with a second network, the first network being different from the second network. The discovery scan procedure may be a device-to-device discovery procedure.

In a third illustrative set of examples, a method for wireless communication at a serving base station is provided. The method may include: communicating with a user equipment (UE) using a first frequency in a first frequency band; receiving, from the UE, information associated with the UE performing a discovery scan procedure on a second frequency in a second frequency band during a discovery scan interval, the second frequency being different from the first frequency; and sending a response to the UE indicating whether the UE is allowed to skip one or more downlink transmissions during the discovery scan interval.

In some aspects, the method may include receiving a capability message from the UE indicating the UE is capable of skipping the one or more downlink transmissions during the discovery scan interval. The response may identify a first portion of the one or more downlink transmissions the UE is allowed to skip during the discovery scan interval. The response may identify a second portion of the one or more downlink transmissions the UE is not allowed to skip during the discovery scan interval. The method may include receiving timing information associated with the discovery scan interval from the UE.

In a fourth illustrative set of examples, an apparatus for wireless communication is provided. The apparatus may include: a processor; memory in electronic communication with the processor; and instructions stored in the memory, the instructions being executable by the processor to: communicate with a user equipment (UE) using a first frequency in a first frequency band; receive, from the UE, information associated with the UE performing a discovery scan procedure on a second frequency in a second frequency band during a discovery scan interval, the second frequency being different from the first frequency; and send a response to the UE indicating whether the UE is allowed to skip one or more downlink transmissions during the discovery scan interval.

In some aspects, the apparatus may include instructions executable by the processor to receive a capability message from the UE indicating the UE is capable of skipping the one or more downlink transmissions during the discovery scan interval. The response may identify a first portion of the one or more downlink transmissions the UE is allowed to skip during the discovery scan interval. The response may identify a second portion of the one or more downlink transmissions the UE is not allowed to skip during the discovery scan interval. The apparatus may include instructions executable by the processor to receive timing information associated with the discovery scan interval from the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

UEs in an active communication session (e.g., in a radio resource control (RRC) connected mode) may communicate with a serving base station using one or more frequencies of a frequency band. A monitoring UE, attempting to receive a discovery signal from an announcing UE operating on a different frequency (e.g., in a different frequency band) than the serving base station of the monitoring UE, may tune a receive chain away from the frequency of the serving base station and to the frequency of the announcing UE. As a result, the monitoring UE may not be able to receive certain downlink transmissions from the monitoring UE's serving base station while the monitoring UE scans for the discovery signal from the announcing UE. Accordingly, it may be beneficial for the monitoring UE to inform the serving base station about the monitoring UE's intention to perform the discovery scan procedure, which may result in skipping the certain downlink transmissions from the serving base station.

According to aspects of the present description, a monitoring UE may inform a serving base station of the monitoring UE's intention to perform a discovery procedure in a different, target frequency (intra or inter public land mobile network (PLMN)) by informing the serving base station about the target frequency, i.e., the frequency of the announcing UE. In some examples, the monitoring UE may use the SLUEInfoMsg field to convey the information. In some examples, the monitoring UE may inform the serving base station whether the monitoring UE is capable of skipping downlink transmissions while in an RRC_CONNECTED/non-discontinuous reception (DRX) mode with the serving base station. If the monitoring UE supports autonomously skipping certain downlink transmissions, the monitoring UE may autonomously skip the downlink transmissions during the discovery procedure. Additionally or alternatively, the serving base station may respond to the monitoring UE and permit or deny the monitoring UE from participating in the discovery procedure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
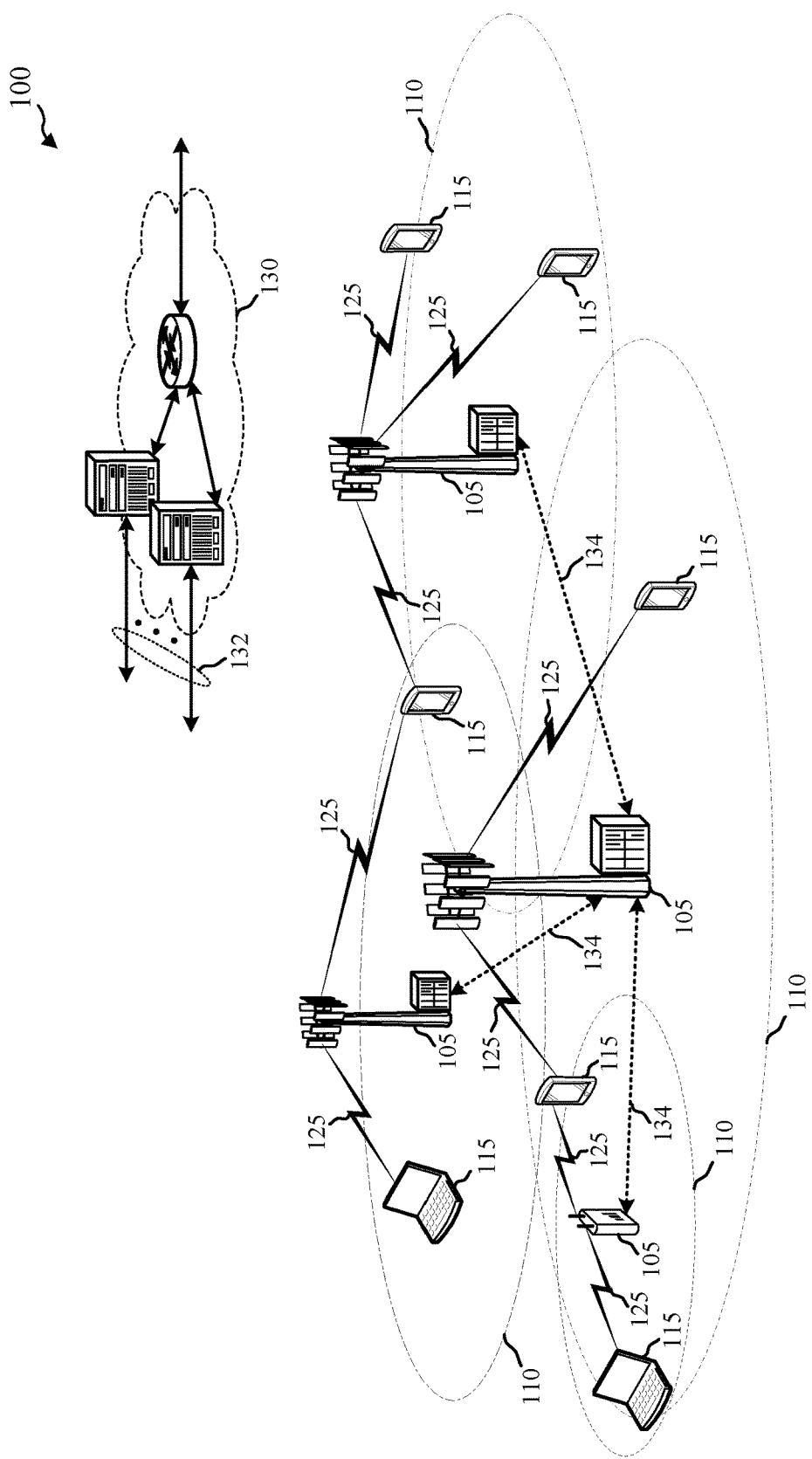
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support inter-frequency and, in some examples, inter-PLMN D2D discovery procedures. For example, a monitoring UE 115 may be communicating with a serving base station 105 using a first frequency of a first frequency band. The monitoring UE 115 may intend to establish a direct D2D communication link with a neighboring UE 115 that transmits D2D discovery signals on a second frequency of a second frequency band. The monitoring UE 115 may know, a priori, what frequencies the neighboring UE 115 transmits a discovery signals on, e.g., the second frequency. The monitoring UE 115 may be communicating with the serving base station 105 and know that tuning to the second frequency may result in skipping one or more downlink transmissions from the serving base station 105. Accordingly, the monitoring UE 115 may inform the serving base station 105 of an intention to monitor for the discovery signals on the second frequency by sending information associated with performing the discovery scan procedure on the second frequency during a discovery scan interval. The monitoring UE 115 may determine a capability to skip a portions of the downlink transmissions from the serving base station during the discovery scan interval. In some examples, the monitoring UE 115 may support autonomously skipping the downlink transmissions during the discovery scan interval and, therefore, sending the information to the serving base station 105 may not affect the serving base station 105 with regard to performing the discovery scan procedure.

In some examples, the serving base station 105 may receive the information from the monitoring UE 115 and may send a response to the monitoring UE 115 indicating whether the monitoring UE 115 is allowed to skip some or all of the downlink transmissions during the discovery scan interval. Accordingly, the serving base station 105 may control whether the monitoring UE 115 may perform the discovery scan procedure and skip the downlink transmissions. In some examples, the serving base station 105 may support partial downlink transmission skipping and may include in the response, for example, an indication of which downlink transmissions can be skipped and which downlink transmissions cannot be skipped.

Figure 2:
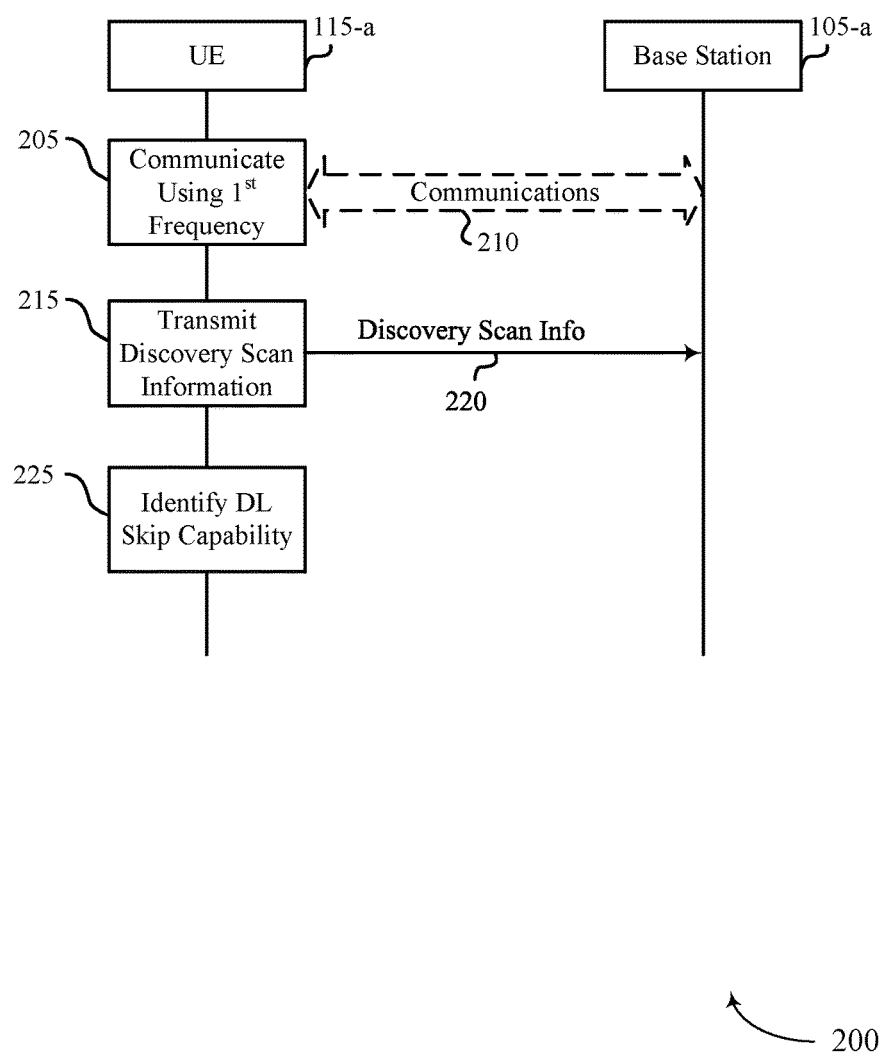
FIG. 2 shows a diagram of aspects of discovery scan procedures for use in wireless communication, in accordance with various aspects of the present disclosure.

FIG. 2 is a diagram 200 illustrating aspects of D2D discovery signaling procedures, in accordance with various aspects of the present disclosure. The diagram 200 may illustrate aspects of the wireless communications system 100 of FIG. 1. The diagram 200 includes a UE 115-*a* and a base station 105-*a*. The UE 115-*a* may be an example of one or more of the UEs 115 described above with respect to FIG. 1. The UE 115-*a* may be a monitoring UE interested in performing a discovery scan procedure with an announcing UE (not shown). The base station 105-*a* may be an example of one or more of the base stations 105 described above with respect to FIG. 1. The base station 105-*a* may be a serving base station of the UE 115-*a*. Generally, the diagram 200 illustrates aspects of implementing D2D discovery procedure signaling protocols in wireless communication systems. In some examples, a system device, such as one of the UEs 115 and/or base station 105, may execute one or more sets of codes to control the functional elements of the device to perform some or all of the functions described below.

At block 205, the UE 115-*a* may be communicating with base station 105-*a* using a first frequency of a first frequency band. For example, the UE 115-*a* may exchange various communications 210 with the base station 105-*a* while in an active communication session (e.g., RRC_connected mode). The active communication session may include the UE 115-*a* sending uplink transmissions to the base stations 105-*a* and receiving downlink transmissions from the base station 105-*a*. The downlink transmissions may include one or more resource elements (REs) of a resource block (RB), the RB being a slot within a subframe. In some examples, the downlink transmissions may include REs spread across multiple slots and/or multiple subframes. In some examples, a bitmap may represent which REs are scheduled for downlink transmissions to the UE 115-*a*.

At block 215, the UE 115-*a* may transmit, to the base station 105-*a*, information associated with performing a scan procedure on a second frequency in a second frequency band during a discovery scan interval. The discovery scan information 220 may include information indicative of the second frequency. The second frequency may be different from the first frequency. Accordingly, the UE 115-*a* may retune at least one receive chain away from the first frequency and to the second frequency during the discovery scan interval.

In some examples, the discovery scan information 220 may also include timing information associated with the discovery scan interval. For example, the timing information may indicate during which subframes the UE 115-*a* may perform the discovery scan procedure, and by extension which subframes of the downlink transmissions from the base station 105-*a* that the UE 115-*a* may skip during the scan interval. In some examples, the timing information may account for time associated with tuning the receive chain away from the first frequency to the second frequency and back to the first frequency, for timing differences between the base station 105-*a* and the announcing UE broadcasting the discovery signal, and the like.

At block 225, the UE 115-*a* may identify a capability to skip one or more downlink transmissions from the base station 105-*a* during the scan interval. As will be described in greater detail below, the ability of the UE 115-*a* to skip the one or more downlink transmissions may be determined autonomously by the UE 115-*a*, by the base station 105-*a*, or by coordination between the UE 115-*a* and the base station 105-*a*.

Figure 3:
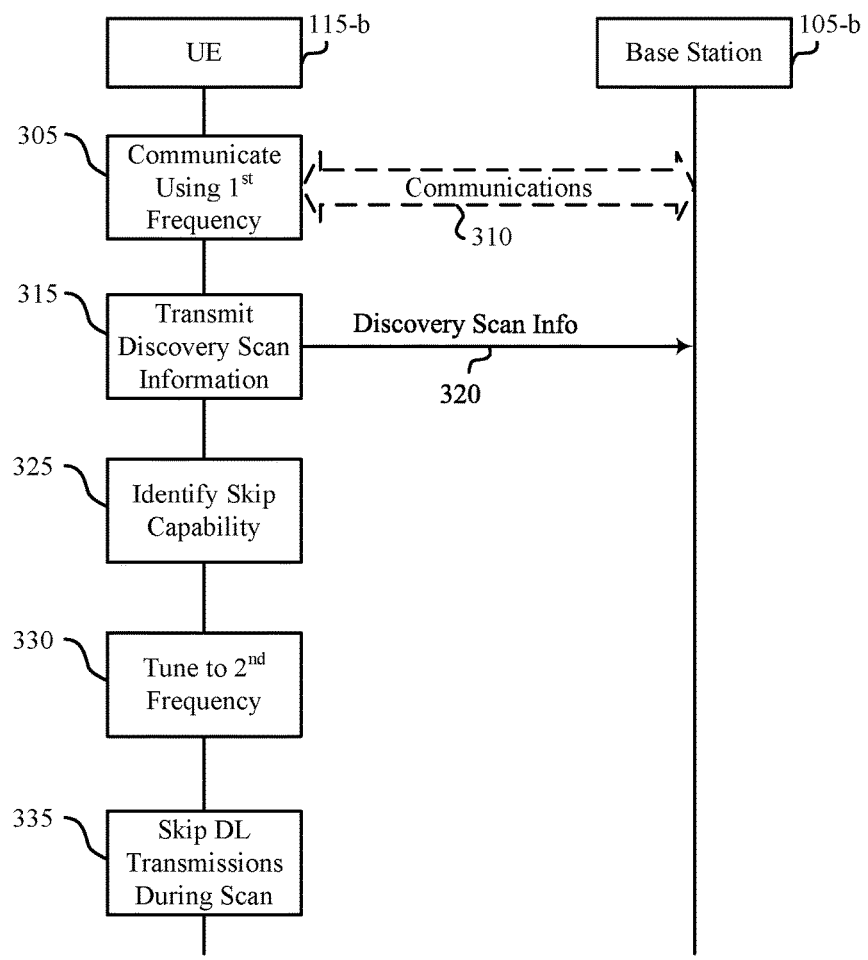
FIG. 3 shows a diagram of aspects of discovery scan procedures for use in wireless communication, in accordance with various aspects of the present disclosure.

FIG. 3 is a diagram 300 illustrating aspects of D2D discovery signaling procedures, in accordance with various aspects of the present disclosure. The diagram 300 may illustrate aspects of the wireless communications system 100 of FIG. 1. The diagram 300 includes a UE 115-*b* and a base station 105-*b*. The UE 115-*b* may be an example of one or more of the UEs 115 described above with respect to FIG. 1. The UE 115-*b* may be a monitoring UE interested in performing a discovery scan procedure with an announcing UE (not shown). The base station 105-*b* may be an example of one or more of the base stations 105 described above with respect to FIG. 1. The base station 105-*b* may be a serving base station of the UE 115-*a*. Generally, the diagram 300 illustrates aspects of implementing D2D discovery procedure signaling protocols in wireless communication systems. In some examples, a system device, such as one of the UEs 115 and/or base station 105, may execute one or more sets of codes to control the functional elements of the device to perform some or all of the functions described below.

At block 305, the UE 115-*b* may be communicating with base station 105-*b* using a first frequency of a first frequency band. For example, the UE 115-*b* may exchange various communications 310 with the base station 105-*b* while in an active communication session (e.g., RRC_connected mode). The active communication session may include the UE 115-*b* sending uplink transmissions to the base stations 105-*b* and receiving downlink transmissions from the base station 105-*b*. The downlink transmissions may include one or more REs of a RB within a subframe.

At block 315, the UE 115-*b* may transmit, to the base station 105-*b*, information associated with performing a scan procedure on a second frequency in a second frequency band during a discovery scan interval. The discovery scan information 320 may include information indicative of the second frequency. The second frequency may be different from the first frequency. Accordingly, the UE 115-*b* may need to retune at least one receive chain away from the first frequency and to the second frequency during the discovery scan interval. In some examples, the discovery scan information 320 may also include timing information associated with the discovery scan interval, e.g., timing information that accounts for receive chain tuning time, asynchronous timing between the base station 105-*b* and the announcing UE broadcasting the discovery signal, etc.

At block 325, the UE 115-*b* may identify a capability to skip one or more downlink transmissions from the base station 105-*a* during the scan interval. The UE 115-*b* may identify the skip capability autonomously, i.e., without receiving a response or information from the base station 105-*b*. For example, the UE 115-*b* may be configured to support autonomous downlink transmission skipping during the discovery scan interval. In some examples, the discovery scan interval may be small with respect to the active communications 310 (e.g., one (1) percent of the time as compared to communications 310) and therefore the UE 115-*b* may be enabled to perform the discovery scan procedure and skip the downlink transmissions. The UE 115-*b* may, as one non-limiting example, rely on hybrid automatic repeat-request (HARD) re-transmission procedures to recover any skipped downlink transmissions.

In another example, the discovery scan information 320 may provide an indication to the base station 105-*b* that the UE 115-*b* may be unavailable during the discovery scan interval. Accordingly, the base station 105-*b* may reschedule a portion of the downlink transmissions to permit the UE 115-*b* to perform the discovery scan procedure and receive the downlink transmissions before and/or afterwards.

At block 330, the UE 115-*b* may retune at least one receive chain away from the first frequency and to the second frequency to perform the discovery scan procedure. For example, the UE 115-*b* may retune one or more receive chains to the second frequency to permit reception of discovery signals broadcast from announcing UE(s). In some examples, the announcing UE may be associated with a different carrier than the UE 115-*b*, e.g., a different PLMN.

At block 335, the UE 115-*b* may perform the discovery scan procedure and may skip the one or more downlink transmissions from the base station 105-*b* during the discovery scan procedure. For example, the receive chain(s) tuned to the second frequency may prohibit reception of downlink transmissions from the base station 105-*b* on the first frequency.

Figure 4:
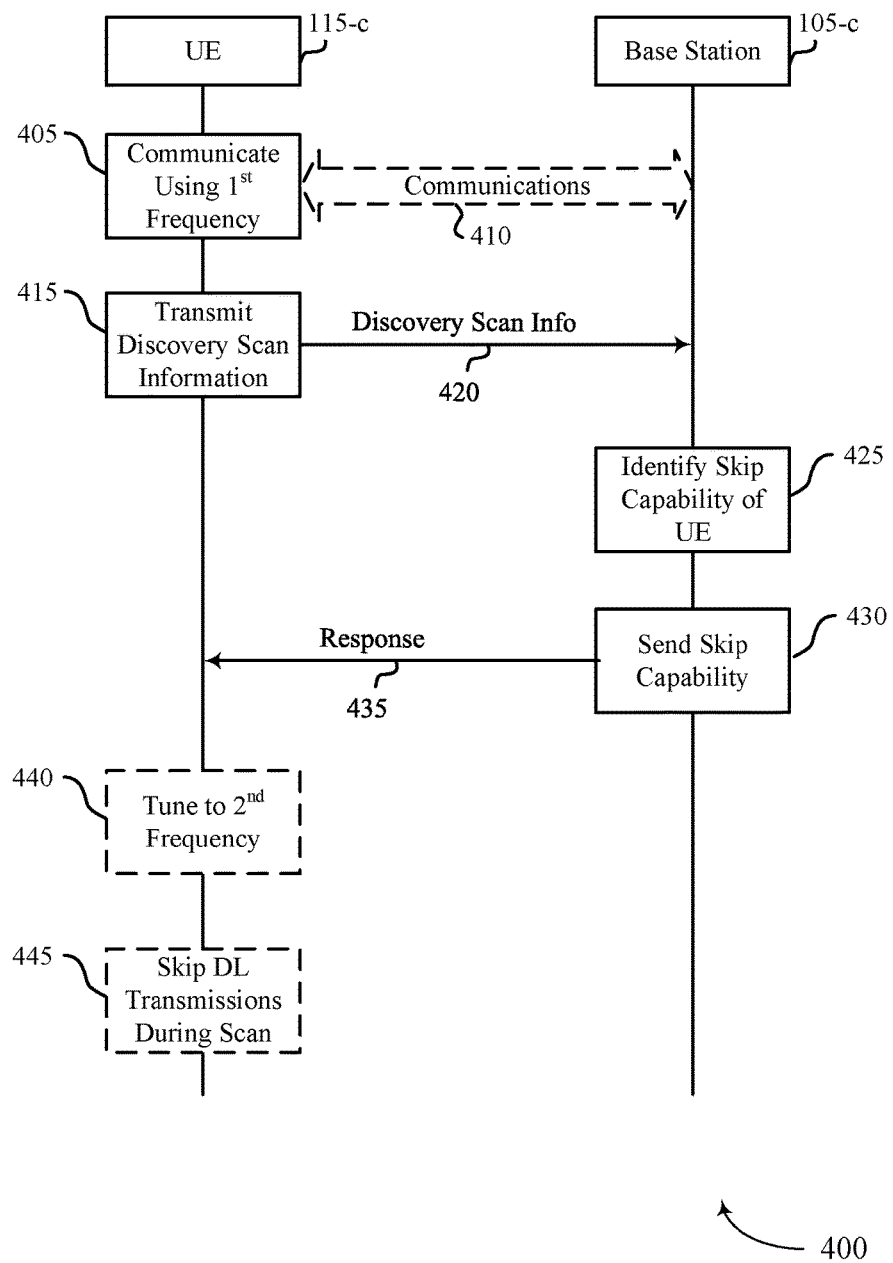
FIG. 4 is a diagram illustrating aspects of D2D discovery signaling procedures, in accordance with various aspects of the parent disclosure.

FIG. 4 is a diagram 400 illustrating aspects of D2D discovery signaling procedures, in accordance with various aspects of the present disclosure. The diagram 400 may illustrate aspects of the wireless communications system 100 of FIG. 1. The diagram 400 includes a UE 115-*c* and a base station 105-*c*. The UE 115-*c* may be an example of one or more of the UEs 115 described above with respect to FIG. 1. The UE 115-*c* may be a monitoring UE interested in performing a discovery scan procedure with an announcing UE (not shown). The base station 105-*c* may be an example of one or more of the base stations 105 described above with respect to FIG. 1. The base station 105-*c* may be a serving base station of the UE 115-*c*. Generally, the diagram 400 illustrates aspects of implementing D2D discovery procedure signaling protocols in wireless communication systems. In some examples, a system device, such as one of the UEs 115 and/or base stations 105, may execute one or more sets of codes to control the functional elements of the device to perform some or all of the functions described below.

At block 405, the UE 115-*c* may be communicating with base station 105-*c* using a first frequency of a first frequency band. For example, the UE 115-*c* may exchange various communications 410 with the base station 105-*c* while in an active communication session (e.g., RRC_connected mode). The active communication session may include the UE 115-*c* sending uplink transmissions to the base stations 105-*c* and receiving downlink transmissions from the base station 105-*c*.

At block 415, the UE 115-*c* may transmit, to the base station 105-*c*, information associated with performing a scan procedure on a second frequency in a second frequency band during a discovery scan interval. The discovery scan information 420 may include information indicative of the second frequency. The second frequency may be different from the first frequency. Accordingly, the UE 115-*c* may need to retune at least one receive chain away from the first frequency and to the second frequency during the discovery scan interval. In some examples, the discovery scan information 420 may also include timing information associated with the discovery scan interval.

At block 425, the base station 105-*c* may identify a capability for the UE 115-*c* to skip one or more downlink transmissions from the base station 105-*c* during the scan interval. For example, the base station 105-*c* may determine which, if any, of the downlink transmissions the UE 115-*c* can skip during the discovery scan interval. In some examples, the base station 105-*c* may identify downlink transmissions that can be skipped or cannot be skipped based on a type of the downlink transmission, a priority level associated with the downlink transmissions, and the like.

At block 430, the base station 105-*c* may send a response 435 to the UE 115-*c* to convey information indicative of the capability of the UE 115-*c* to skip the one or more downlink transmissions. The response may authorize the UE 115-*c* to skip certain downlink transmissions during the discovery scan interval and/or may prohibit the UE 115-*c* to skip certain downlink transmissions during the discovery scan interval.

If authorized, at block 440 the UE 115-*c* may retune at least one receive chain away from the first frequency and to the second frequency to perform the discovery scan procedure. For example, the UE 115-*c* may retune one or more receive chains to the second frequency to permit reception of discovery signals broadcast from announcing UE(s). In some examples, the announcing UE may be associated with a different carrier than the UE 115-*c*, e.g., a different PLMN.

If authorized, at block 445, the UE 115-*c* may perform the discovery scan procedure and skip the one or more downlink transmissions from the base station 105-*c* during the discovery scan procedure. For example, the receive chain(s) tuned to the second frequency may prohibit reception of downlink transmissions from the base station 105-*c* on the first frequency.

Figure 5:
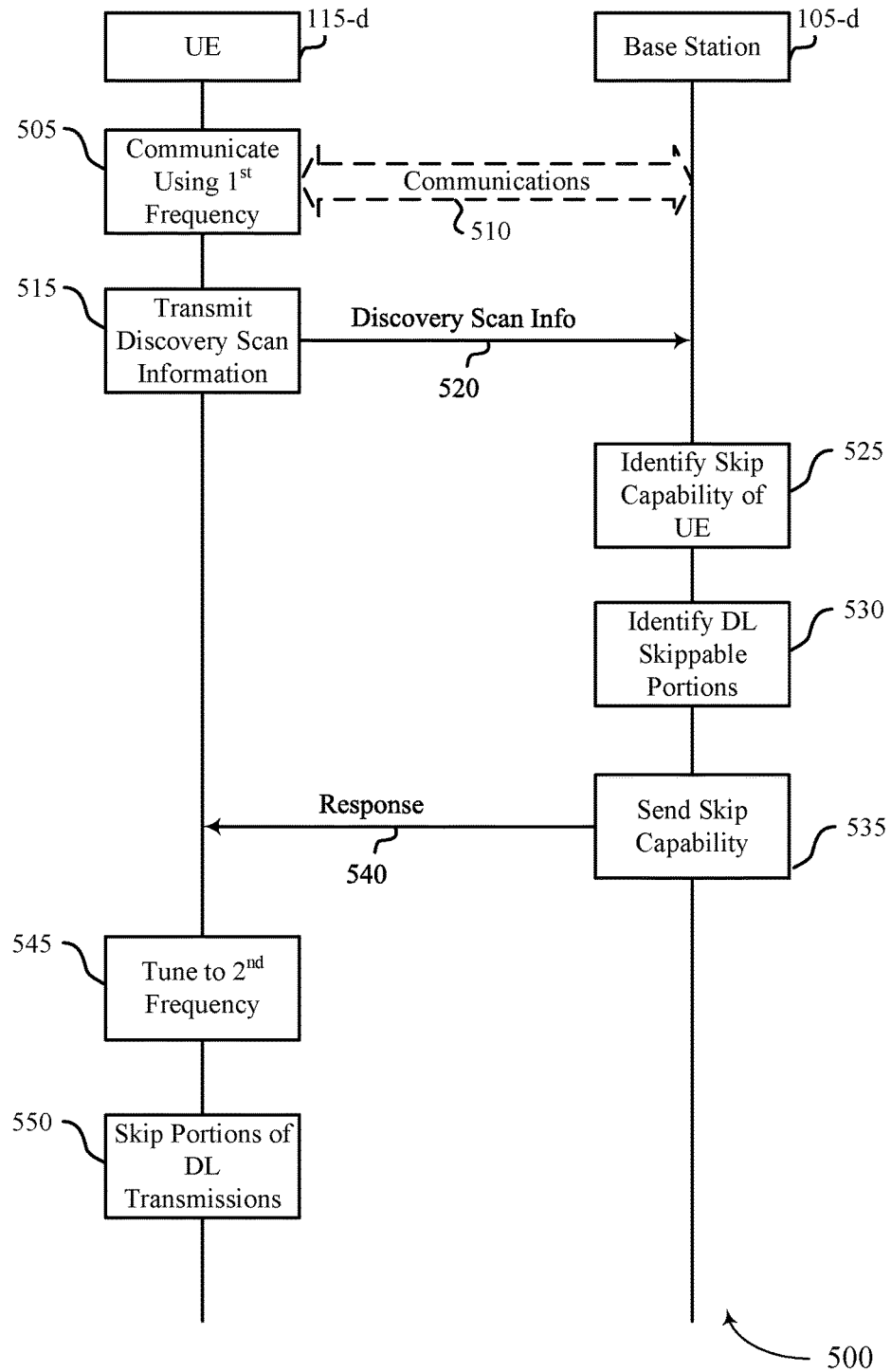
FIG. 5 shows a diagram of aspects of discovery scan procedures for use in wireless communication, in accordance with various aspects of the present disclosure.

FIG. 5 is a diagram 500 illustrating aspects of D2D discovery signaling procedures, in accordance with various aspects of the present disclosure. The diagram 500 may illustrate aspects of the wireless communications system 100 of FIG. 1. The diagram 500 includes a UE 115-*d* and a base station 105-*d*. The UE 115-*d* may be an example of one or more of the UEs 115 described above with respect to FIG. 1. The UE 115-*d* may be a monitoring UE interested in performing a discovery scan procedure with an announcing UE (not shown). The base station 105-*d* may be an example of one or more of the base stations 105 described above with respect to FIG. 1. The base station 105-*d* may be a serving base station of the UE 115-*d*. Generally, the diagram 500 illustrates aspects of implementing D2D discovery procedure signaling protocols in wireless communication systems. In some examples, a system device, such as one of the UEs 115 and/or base stations 105, may execute one or more sets of codes to control the functional elements of the device to perform some or all of the functions described below.

At block 505, the UE 115-*d* may be communicating with base station 105-*d* using a first frequency of a first frequency band. For example, the UE 115-*d* may exchange various communications 410 with the base station 105-*d* while in an active communication session (e.g., RRC_connected mode). The active communication session may include the UE 115-*d* sending uplink transmissions to the base stations 105-*d* and receiving downlink transmissions from the base station 105-*d*.

At block 515, the UE 115-*d* may transmit, to the base station 105-*d*, information associated with performing a scan procedure on a second frequency in a second frequency band during a discovery scan interval. The discovery scan information 520 may include information indicative of the second frequency. The second frequency may be different from the first frequency. Accordingly, the UE 115-*d* may need to retune at least one receive chain away from the first frequency and to the second frequency during the discovery scan interval. In some examples, the discovery scan information 520 may also include timing information associated with the discovery scan interval.

At block 525, the base station 105-*d* may identify a capability for the UE 115-*d* to skip one or more downlink transmissions from the base station 105-*d* during the scan interval. In the example diagram 500, the base station 105-*d* may authorize the UE 115-*d* to skip at least a portion of the downlink transmissions occurring during the discovery scan interval.

At block 530, the base station 105-*d* may determine which of the downlink transmissions the UE 115-*d* can skip during the discovery scan interval. In some examples, the base station 105-*d* may identify downlink transmissions that can be skipped or cannot be skipped based on a type of the downlink transmission, a priority level associated with the downlink transmissions, and the like.

At block 535, the base station 105-*d* may send a response 540 to the UE 115-*d* to convey information indicative of the capability of the UE 115-*d* to skip the one or more downlink transmissions. The response may authorize the UE 115-*d* to skip certain downlink transmissions during the discovery scan interval and/or may prohibit the UE 115-*d* from skipping certain downlink transmissions during the discovery scan interval. In one example, the response 540 may include a bitmap that corresponds to the skippable downlink transmissions and the non-skippable downlink transmissions. The bitmap may correspond to REs of subframes associated with the downlink transmissions.

At block 545 the UE 115-*d* may retune at least one receive chain away from the first frequency and to the second frequency to perform the discovery scan procedure. For example, the UE 115-*d* may retune one or more receive chains to the second frequency to permit reception of discovery signals broadcast from announcing UE(s). In one example, the UE 115-*d* may retune one receive chain to the second frequency but keep a second receive chain tuned to the first frequency to receive the non-skippable downlink transmissions during the discovery scan interval.

At block 550, the UE 115-*d* may perform the discovery scan procedure and skip the skippable downlink transmissions and receive the non-skippable downlink transmissions from the base station 105-*d* during the discovery scan procedure. For example, at least one receive chain may be tuned to the second frequency and at least one receive chain may be tuned to the first frequency during the discovery scan interval.

Figure 6:
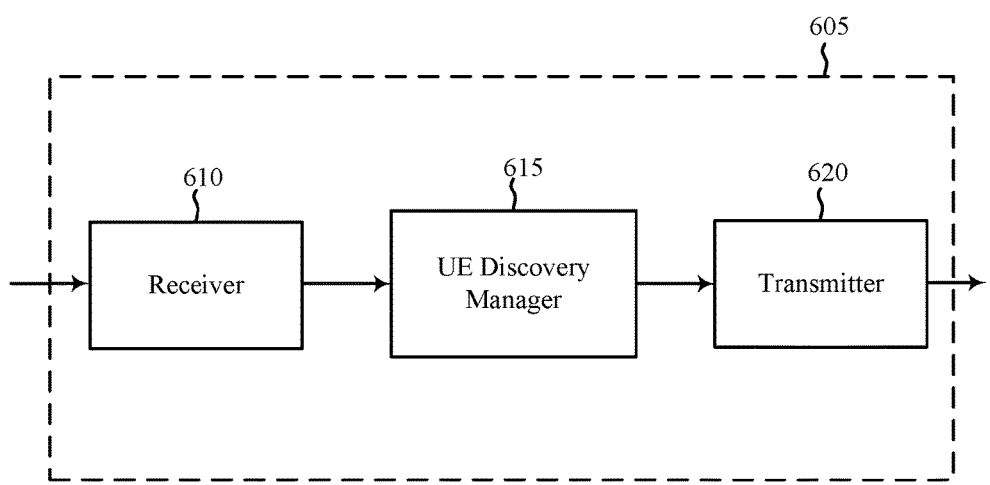
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 described with reference to FIGS. 1-5. The device 605 may include a receiver 610, a UE discovery manager 615, and/or a transmitter 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver 610 may be configured to receive various signals associated with D2D discovery and associated signaling protocols. Information may be passed on to the UE discovery manager 615, and to other components of the device 605.

The UE discovery manager 615 may monitor, control, or otherwise manage one or more aspects of a D2D discovery operations for the device 605. For example, the UE discovery manager 615 may, alone or in cooperation with other components of the device 605, manage aspects of communicating with a serving base station using a first frequency in a first frequency band. The communications with the serving base station may occur during an active communication session between the device 605 and the serving base station. The UE discovery manager 615 may transmit, to the serving base station, information associated with performing a discovery scan procedure on a second frequency in a second frequency band during a discovery scan interval. The first frequency may be different from the second frequency. In some examples, the discovery scan procedure may be an inter-PLMN procedure where the announcing UE is associated with a different carrier or service provider than the serving base station. The UE discovery manager 615 may identify a capability to skip one or more downlink transmissions from the serving base station during the discovery scan interval. For example, the device 605 and/or the serving base station may determine which, if any, of the downlink transmissions the device 605 can skip during the discovery scan interval.

The transmitter 620 may transmit the one or more signals received from other components of the device 605. The transmitter 620 may transmit various signals associated with D2D discovery and associated signaling protocols. In some examples, the transmitter 620 may be collocated with the receiver 610 in a transceiver module.

Figure 7:
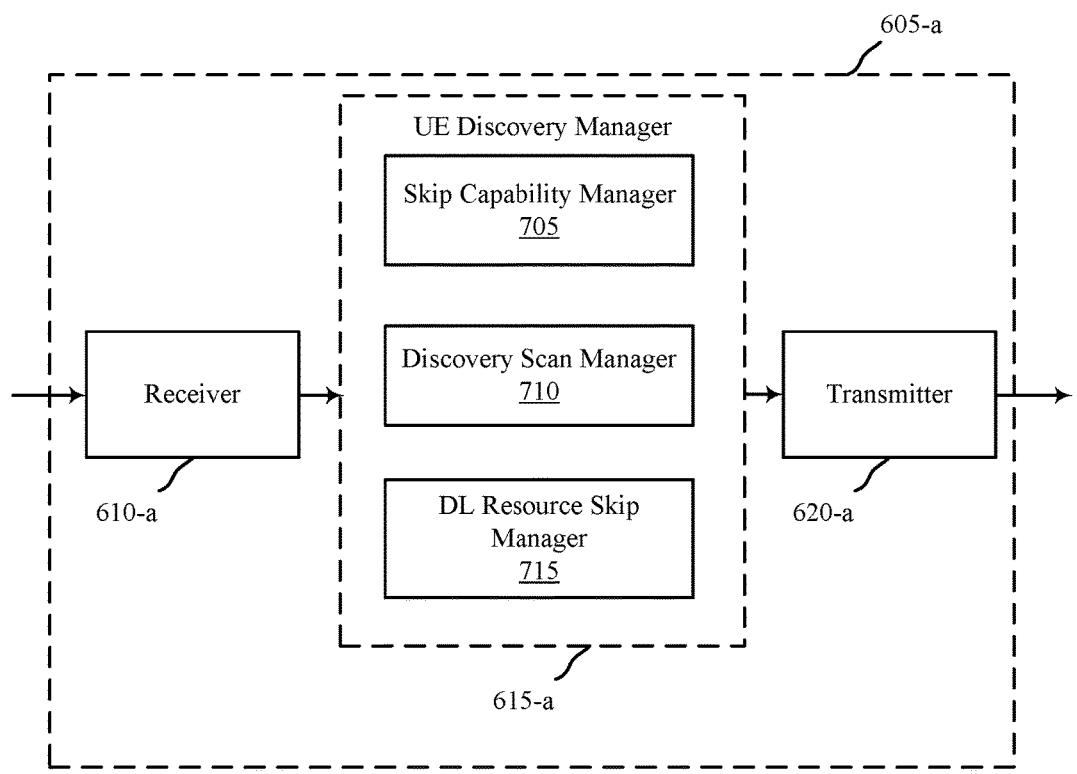
FIG. 7 shows a block diagram of a device configured for use in wireless communication, in accordance with various aspects of the present disclosure.

FIG. 7 shows a block diagram 700 of a device 605-*a* for use in wireless communication, in accordance with various examples. The device 605-*a* may be an example of one or more aspects of a UE 115 described with reference to FIGS. 1-5. The device 605-a may also be an example of a device 605 described with reference to FIG. 6. The device 605-a may include a receiver 610-a, a UE discovery manager 615-a, and/or a transmitter 620-a, which may be examples of the corresponding modules of device 605. The device 605-a may also include a processor (not shown). Each of these components may be in communication with each other. The UE discovery manager 615-a may include a skip capability manager 705, a discovery scan manager 710, and/or a downlink resource skip manager 715. The receiver 610-a and the transmitter 620-a may perform the functions of the receiver 610 and the transmitter 620 of FIG. 6, respectively.

The skip capability manager 705 may monitor, control, or otherwise manage one or more aspects of identifying a skip capability for the device 605-a. For example, the device 605-a may be communicating with a serving base station using a first frequency in a first frequency band and the skip capability manager 705 may transmit, to the serving base station, information associated with a discovery scan procedure on a second frequency in a second frequency band during a discovery scan interval. The first frequency may be different from the second frequency and, in some examples, the serving base station may be associated with a first network and the discovery scan procedure may be associated with a second network, the first network being different from the second network (e.g., inter-PLMN discovery procedure). The discovery scan procedure may be a D2D discovery procedure.

In some aspects, the skip capability manager 705 may independently determine whether the device 605-a can skip the one or more downlink transmissions during the discovery scan interval. In other aspects, the skip capability manager 705 may receive a response from the serving base station providing an indication of whether the device 605-a can skip the one or more downlink transmission during the discovery scan interval.

In some aspects, the information transmitted to the serving base station associated with performing the discovery scan procedure may include the second frequency. Thus, the device 605-a sending the second frequency may provide an indication to the serving base station that the device 605-a intends or desires to skip the one or more downlink transmissions during the discovery scan interval.

In some aspects, the information transmitted to the serving base station associated with performing the discovery scan procedure may include timing information associated with the discovery scan interval. The timing information may include information indicative of the one or more subframes where the device 605-a may skip the one or more downlink transmission from the serving base station. For example, the timing information may indicate which subframes the discovery scan interval encompasses. In some examples, the timing information may be based on timing differences between the serving base station and the announcing UE. For example, the skip capability manager 705 may select the subframes of the discovery scan interval based on the timing difference (e.g., to account for partially overlapping subframes) between the serving base station and the device transmitting the discovery signal associated with the discovery scan procedure.

In some aspects, the timing information may account for tuning time of the device 605-a. For example, the skip capability manager 705 may determine a timing parameter associated with tuning to and tuning away from the second frequency and select the subframes to account for this parameter. Thus, the discovery scan interval may include, in some examples, one or more subframes based on the time to tune to the second frequency, the time to perform the discovery scan procedure, and the time to tune away from the second frequency, accounting for any timing differences between the serving base station and the announcing UE.

The discovery scan manager 710 may monitor, control, or otherwise manage one or more aspects of discovery scan operations for the device 605-a. For example, the discovery scan manager 710 may tune to the second frequency. As discussed, the device 605-a may determine that the device 605-a can skip the downlink transmissions during the discovery scan interval without receiving a response from the base station. Accordingly, the discovery scan manager 710 may tune to the second frequency during (or immediately prior to considering frame timing of the announcing UE) the discovery scan interval.

In another example, the serving base station may send a response to the device 605-a indicating whether the device 605-a is allowed to skip the one or more downlink transmissions during the discovery scan interval. In some examples, the response may include an indication that the device may skip only a portion of the downlink transmissions. The response may, for example, include a bitmap associated with which downlink transmissions can be skipped and which downlink transmissions cannot be skipped. Accordingly, the discovery scan manager 710 may tune to the second frequency during the discovery scan interval when permitted by the serving base station and during the skippable portions of the downlink transmissions.

The downlink resource skip manager 715 may monitor, control, or otherwise manage one or more aspects of skipping downlink transmissions for the device 605-a. For example, the downlink resource skip manager 715 may manage aspects of skipping one or more downlink transmissions during a discovery scan interval. As discussed, the device 605-a may autonomously identify a skip capability and the downlink resource skip manager 715 may skip the downlink transmissions during the discovery scan interval. In other examples, the downlink resource skip manager 715 may skip all or some of the downlink transmissions during the scan interval when permitted and as instructed by the serving base stations. For example, the response from the serving base station may permit skipping a first portion of the one or more downlink transmissions during the discovery scan interval and receiving a second portion of the one or more downlink transmissions during the discovery scan interval. The response may include a bitmap associated with which portions of the downlink transmission can be skipped and which portions cannot be skipped, i.e., are to be received. The downlink resource skip manager 715 may manage skipping the permitted portions of the downlink transmissions.

Figure 8:
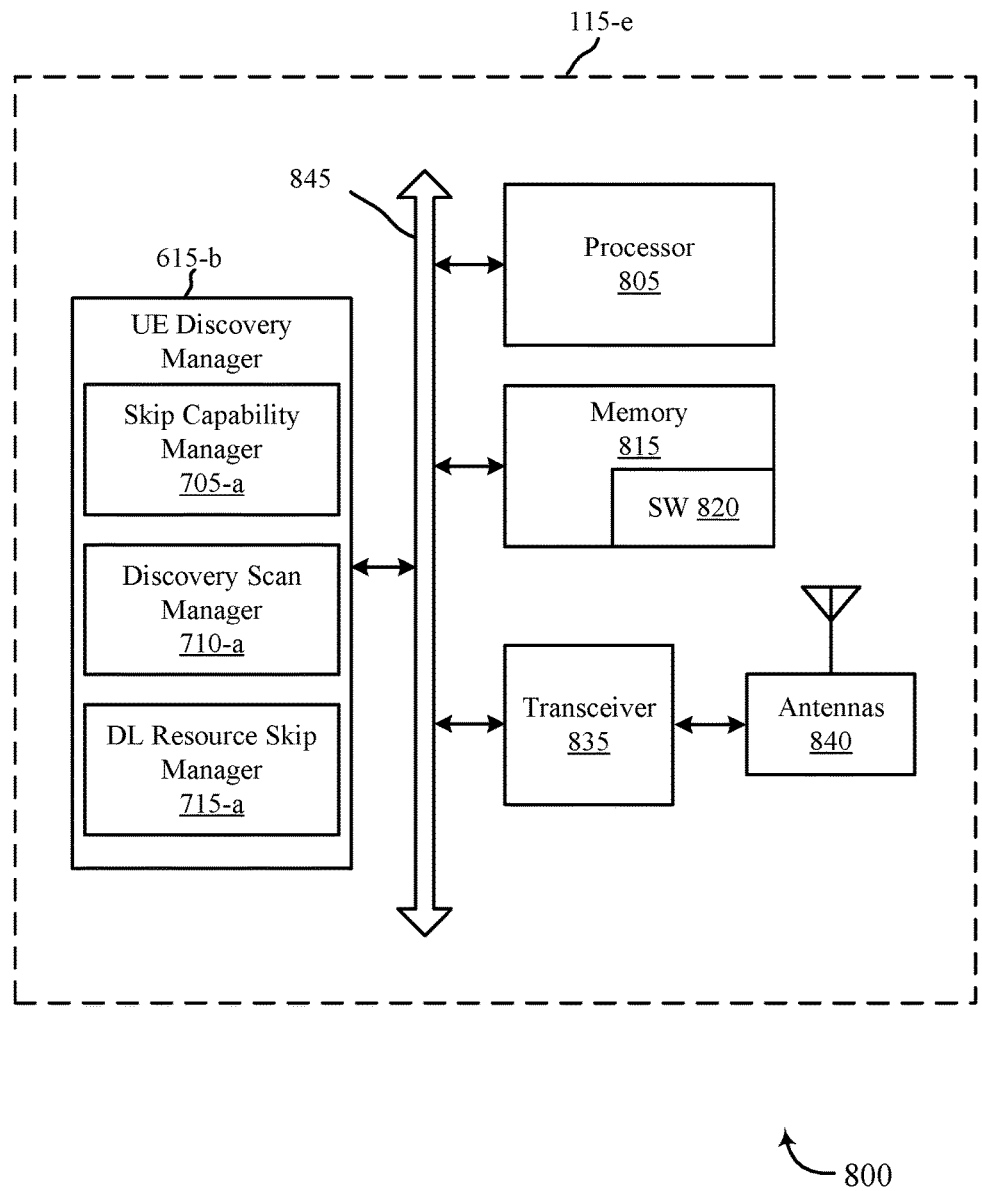
FIG. 8 shows a block diagram of a user equipment for use in wireless communications, in accordance with various aspects of the present disclosure.

FIG. 8 illustrates a block diagram of portions of a system 800 including a user equipment 115-e for use in wireless communication, in accordance with various aspects of the present disclosure. In some examples, the UE 115-e may be an example of the UEs 115 (e.g., a monitoring UE) described with respect to FIGS. 1-5, and/or devices 605 of FIGS. 6 and 7. UE 115-e may include a UE discovery manager 615-b which may be an example of and perform the functions of the UE discovery manager 615 described with respect to FIGS. 6 and 7. UE 115-e may include components for bi-directional voice and data communications including components for transmitting communications and components for receiving communications. For example, UE 115-*e* may communicate bi-directionally with base stations and/or other UEs.

UE 115-*e* may include a processor 805, and memory 815 (e.g., including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station or another UE. The transceiver 835 may include a modem to modulate the packets and provide the modulated packets to the antenna(s) 840 for transmission, and to demodulate packets received from the antenna(s) 840. While UE 115-*e* may include a single antenna 840, UE 115-*e* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., signaling protocols for D2D discovery procedures, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

The UE discovery manager 615-*b* may be configured to perform and/or control some or all of the features and/or functions described with reference to FIGS. 1-7 related to signaling protocols for D2D discovery operations for the UE 115-*e*. In some examples, the UE discovery manager 615-*b* may communicate with a serving base station using a first frequency in a first frequency band, transmit to the serving base station information associated with performing a discovery scan procedure on a second frequency in a second frequency band during a discovery scan interval (the first frequency being different from the second frequency), and identify a capability to skip one or more downlink transmissions from the serving base station during the discovery scan interval. The UE discovery manager 615-*b*, or portions thereof, may include a processor, and/or some or all of the functions of the UE discovery manager 615-*b* may be performed by the processor 805 and/or in connection with the processor 805. In some examples, the UE discovery manager 615-*b* may be an example of the UE discovery manager 615 described with reference to FIGS. 6, and/or 7. For example, the UE discovery manager 615-*b* may include a skip capability manager 705-*a*, a discovery scan manager 710-*a*, and/or a downlink resource skip manager 715-*a*, which may be examples of and perform the functions of the skip capability manager 705, the discovery scan manager 710, and/or the downlink resource skip manager 715, respectively, described with reference to FIG. 7.

Figure 9:
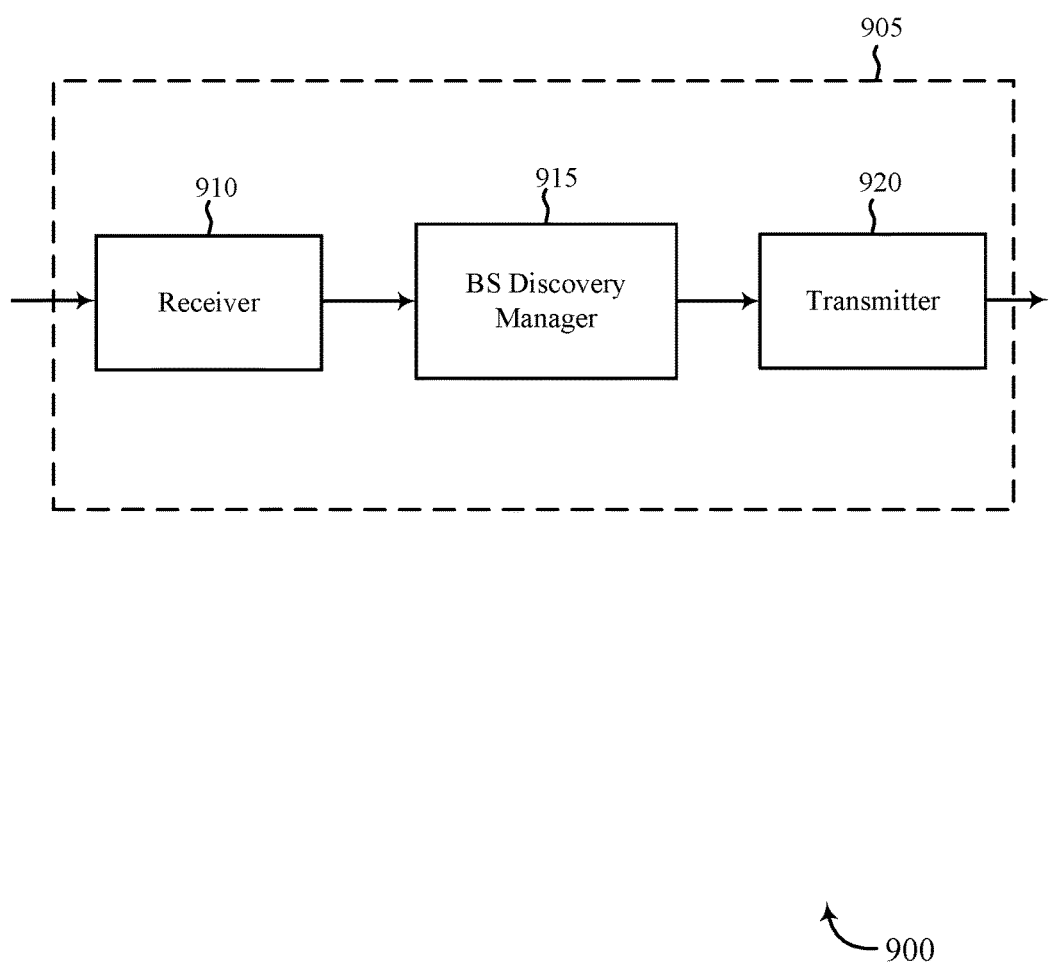
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105 described with reference to FIGS. 1-5. The apparatus 905 may be a serving base station for a monitoring UE 115. In some examples, the apparatus 905 may be part or include an LTE/LTE-A eNB and/or an LTE/LTE-A base station. The apparatus 905 may also be a processor. The apparatus 905 may include a receiver 910, a base station discovery manager 915, and/or a transmitter 920. Each of these modules may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one radio frequency (RF) receiver, such as an RF receiver operable to receive various signaling protocols associated with D2D discovery operations. The receiver 910 may be used to receive various types of data and/or control signals (i.e., transmissions) over one or more communication links of a wireless communication system, such as one or more communication links of the wireless communications system 100 described with reference to FIG. 1.

In some examples, the transmitter 920 may include at least one RF transmitter, such as at least one RF transmitter operable to transmit various signaling protocols associated with D2D discovery procedures. The transmitter 90 may be used to transmit various types of data and/or control signals (i.e., transmissions) over one or more communication links of a wireless communication system, such as one or more communication links of the wireless communications system 100 described with reference to FIG. 1.

The base station discovery manager 915 may monitor, control, or otherwise manage one or more aspects of signaling protocols for D2D discovery operations for the apparatus 905. For example, the base station discovery manager 915 may manage aspects of communicating with a UE using a first frequency in a first frequency band. The base station discovery manager 915 may manage aspects of receiving, from the UE, information associated with the UE performing a discovery scan procedure on a second frequency in a second frequency band during a discovery scan interval, the second frequency being different from the first frequency. The base station discovery manager 915 may manage aspects of sending a response to the UE indicating whether the UE is allowed to skip one or more downlink transmissions during the discovery scan interval. For example, the base station discovery manager 915 may determine whether the UE can skip the one or more downlink transmissions during the discovery scan procedure.

In some aspects, the base station discovery manager 915 may manage aspects of receiving a capability message from the UE indicating the UE is capable of skipping the one or more downlink transmissions during the discovery scan interval. The capability message may indicate whether the UE can support skipping the downlink transmissions.

In some aspects, the base station discovery manager 915 may manage aspects of the response identifying a first portion of the one or more downlink transmissions the UE is allowed to skip during the discovery scan interval and/or identifying a second portion of the one or more downlink transmissions the UE is not allowed to skip during the discovery scan interval. In one example, the response may include a bitmap (e.g., 1's and 0's) indicating which downlink transmissions can be skipped and which downlink transmissions cannot be skipped during the discovery scan interval.

In some aspects, the base station discovery manager 915 may manage aspects of receiving timing information associated with the discovery scan interval from the UE. The timing information may include information identifying which subframe(s) are associated with the discovery scan interval, e.g., which subframes the UE may perform the discovery scan procedure.

Figure 10:
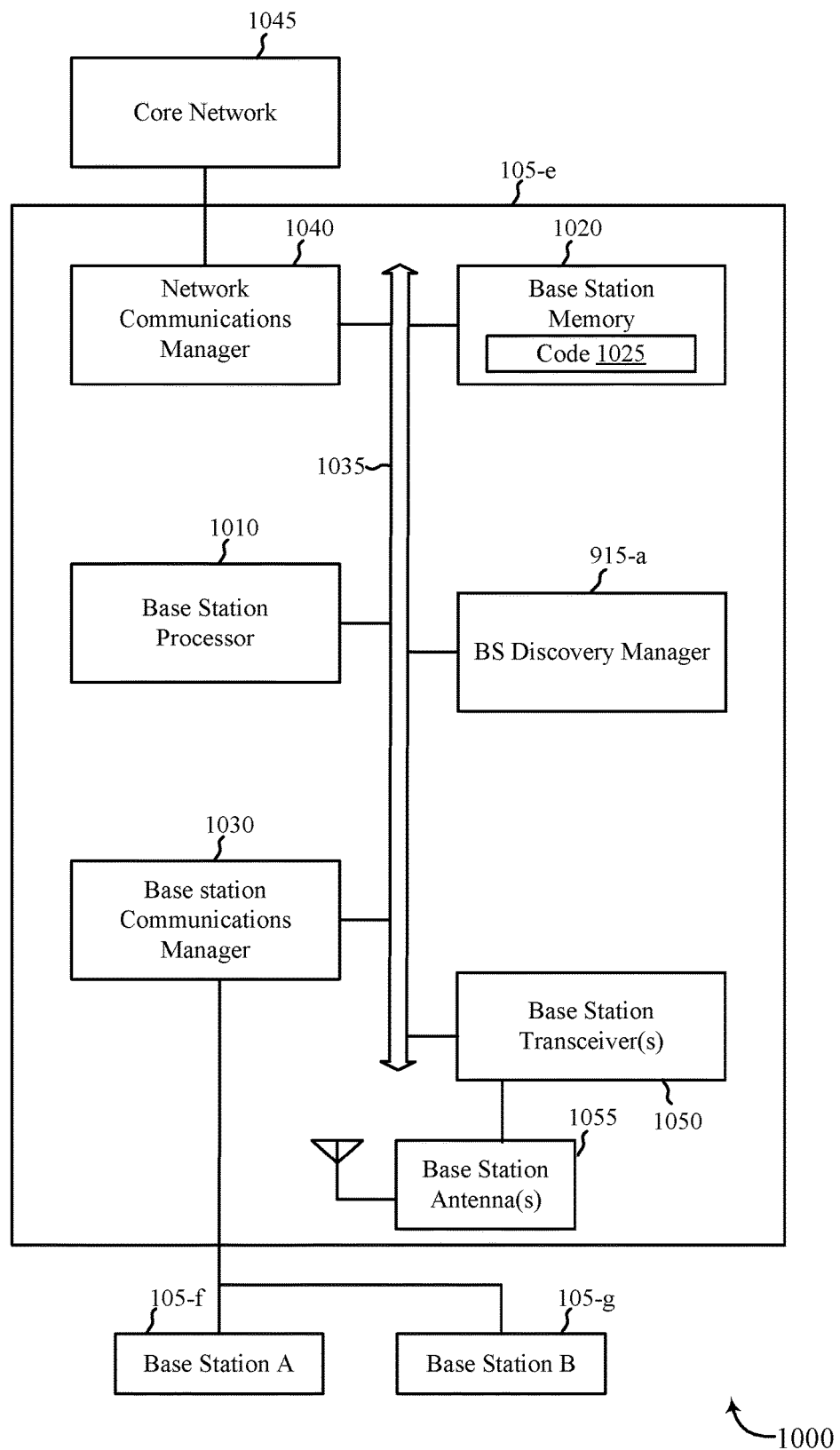
FIG. 10 shows a block diagram of a base station (e.g., a base station forming part or all of an eNB) for use in wireless communications, in accordance with various aspects of the present disclosure.

FIG. 10 shows a block diagram 1000 of a base station 105-*e* (e.g., a base station forming part or all of an eNB) for use in wireless communication, in accordance with various aspects of the present disclosure. In some examples, the base station 105-*e* may be an example of aspects of one or more of the base stations 105 described with reference to FIGS. 1-5, and/or aspects of one or more of the apparatuses 905 when configured as a base station, as described with reference to FIG. 9. The base station 105-*e* may be configured to implement or facilitate at least some of the base station and/or apparatus features and functions described with reference to FIGS. 1-9.

The base station 105-*e* may include a base station processor 1010, a base station memory 1020, at least one base station transceiver (represented by base station transceiver 1050), at least one base station antenna (represented by base station antenna(s) 1055), and/or a base station discovery manager 915-*a*. The base station 105-*e* may also include one or more of a base station communications manager 1030 and/or a network communications manager 1040. Each of these modules may be in communication with each other, directly or indirectly, over one or more buses 1035.

The base station memory 1020 may include random access memory (RAM) and/or read-only memory (ROM). The base station memory 1020 may store computer-readable, computer-executable software/firmware code 1025 containing instructions that are configured to, when executed, cause the base station processor 1010 to perform various functions described herein related to wireless communication (e.g., to perform signaling protocols for D2D discovery operations in a wireless communication system, etc.). Alternatively, the computer-readable, computer-executable software/firmware code 1025 may not be directly executable by the base station processor 1010 but be configured to cause the base station 105-*e* (e.g., when compiled and executed) to perform various of the functions described herein.

The base station processor 1010 may include an intelligent hardware device, e.g., a central processing unit (CPU), a microcontroller, an ASIC, etc. The base station processor 1010 may process information received through the base station transceiver 1050, the base station communications manager 1030, and/or the network communications manager 1040. The base station processor 1010 may also process information to be sent to the base station transceiver 1050 for transmission through the antenna(s) 1055, to the base station communications manager 1030, for transmission to one or more other base stations 105-*f* and 105-*g*, and/or to the network communications manager 1040 for transmission to a core network 1045, which may be an example of one or more aspects of the core network 130 described with reference to FIG. 1. The base station processor 1010 may handle, alone or in connection with the base station discovery manager 915-*a*, various aspects of signaling protocols associated with D2D discovery operations for the base station 105-*e*.

The base station transceiver 1050 may include a modem configured to modulate packets and provide the modulated packets to the base station antenna(s) 1055 for transmission, and to demodulate packets received from the base station antenna(s) 1055. The base station transceiver 1050 may, in some examples, be implemented as one or more base station transmitter modules and one or more separate base station receiver modules. The base station transceiver 1050 may support communications in a first radio frequency spectrum band and/or a second radio frequency spectrum band. The base station transceiver 1050 may be configured to communicate bi-directionally, via the antenna(s) 1055, with one or more UEs or devices, such as one or more of the UEs 115 described with reference to FIG. 1. The base station 105-*e* may, for example, include multiple base station antennas 1055 (e.g., an antenna array). The base station 105-*e* may communicate with the core network 1045 through the network communications manager 1040. The base station 105-*e* may also communicate with other base stations, such as the base stations 105-*f* and 105-*g*, using the base station communications manager 1030.

The base station discovery manager 915-*a* may be configured to perform and/or control some or all of the features and/or functions described with reference to FIGS. 1-9 related to signaling protocols associated with D2D discovery operations for the base station 105-*e*. In some examples, the base station discovery manager 915-*a* may manage aspects of communicating with a UE using a first frequency in a first frequency band. The base station discovery manager 915-*a* may manage aspects of receiving, from the UE, information associated with the UE performing a discovery scan procedure on a second frequency in a second frequency band during a discovery scan interval, the second frequency being different from the first frequency. The base station discovery manager 915-*a* may manage aspects of sending a response to the UE indicating whether the UE is allowed to skip one or more downlink transmissions during the discovery scan interval. The base station discovery manager 915-*a*, or portions thereof, may include a processor, and/or some or all of the functions of the base station discovery manager 915-*a* may be performed by the base station processor 1010 and/or in connection with the base station processor 1010. In some examples, the base station discovery manager 915-*a* may be an example of the base station discovery manager 915 described with reference to FIG. 9.

Figure 11:
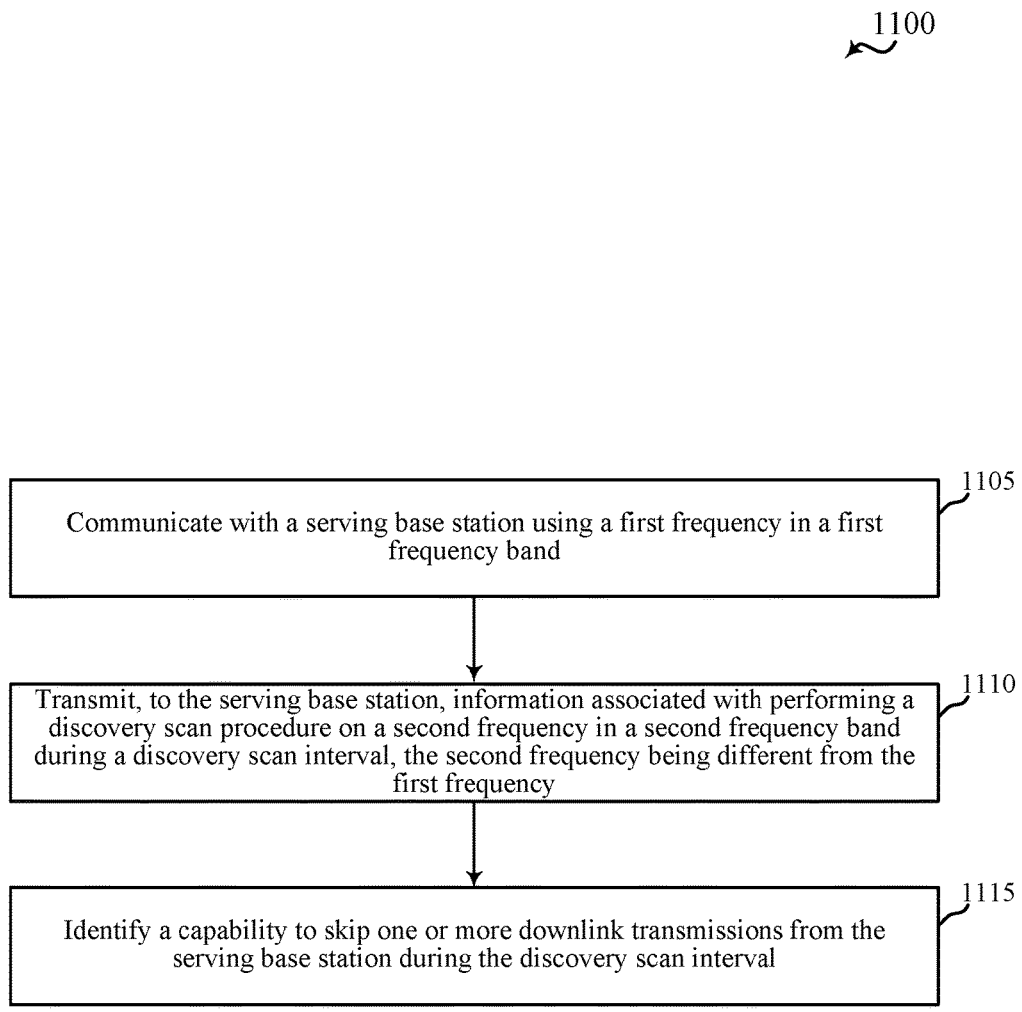
FIG. 11 is a flow chart illustrating an example of a method for wireless communication, in accordance with various aspects of the present disclosure.

FIG. 11 shows a flowchart illustrating a method 1100 for wireless communications, in accordance with various aspects of the present disclosure. The operations of method 1100 may be implemented by a UE 115 or its components, and/or by a device 605 as described with reference to FIGS. 1-8. For example, the operations of method 1100 may be performed by the UE discovery manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1100 will be described with reference to a UE, such as a monitoring UE 115.

At block 1105, the method 1100 may include the UE communicating with a serving base station using a first frequency in a first frequency range. The UE may be communicating with the serving base station during an active communication session where the UE is in an RRC-_connected mode. The communication session may be associated with the UE receiving one or more downlink transmissions from the serving base station.

At block 1110, the method 1100 may include the UE transmitting, to the serving base station, information associated with performing a discovery scan procedure on a second frequency in a second frequency band during a discovery scan interval. The second frequency may be different from the first frequency. The information transmitted may include an indication of the second frequency. In some examples, the discovery scan procedure may be an inter-PLMN D2D discovery scan procedure where the serving base station and the announcing UE broadcasting the discovery signal are associated with different carriers or network providers.

At block 1115, the method 1100 may include the UE identifying a capability to skip one or more downlink transmission from the serving base station during the discovery scan interval. The UE may identify the skip capability autonomously and/or based on communications with the serving base station.

The operation(s) at blocks 1105, 1110, and/or 1115 may be performed using the UE discovery manager 615 described with reference to FIGS. 6-8.

Thus, the method 1100 may provide for wireless communication. It should be noted that the method 1100 is just one implementation and that the operations of the method 1100 may be rearranged or otherwise modified such that other implementations are possible.

Figure 12:
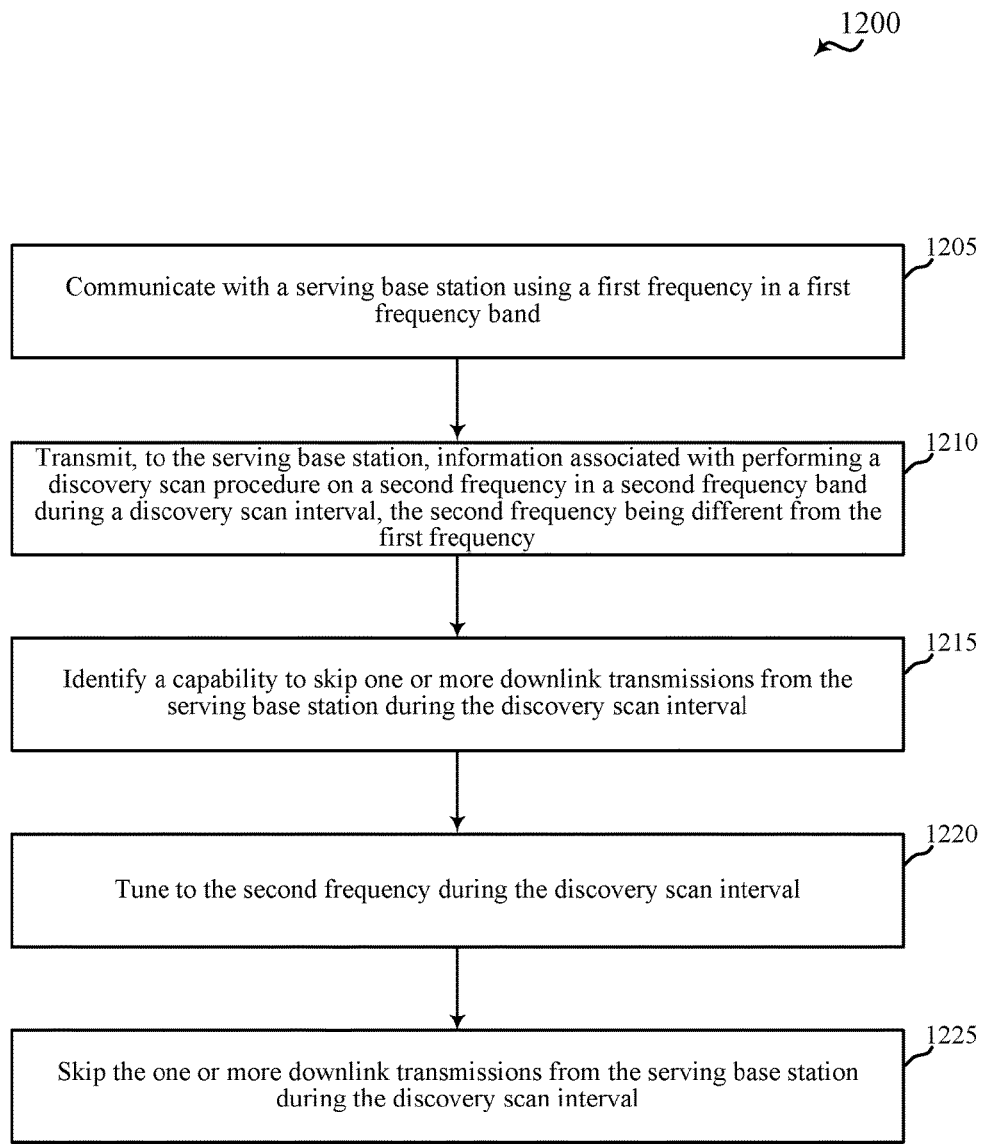
FIG. 12 is a flow chart illustrating an example of a method for wireless communication, in accordance with various aspects of the present disclosure.

FIG. 12 shows a flowchart illustrating a method 1200 for wireless communications, in accordance with various aspects of the present disclosure. The operations of method 1200 may be implemented by a UE 115 or its components, and/or by a device 605 as described with reference to FIGS. 1-8. For example, the operations of method 1200 may be performed by the UE discovery manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1200 will be described with reference to a UE, such as a monitoring UE 115.

At block 1205, the method 1200 may include the UE communicating with a serving base station using a first frequency in a first frequency range. The UE may be communicating with the serving base station during an active communication session where the UE is in an RRC_connected mode. The communication session may be associated with the UE receiving one or more downlink transmissions from the serving base station.

At block 1210, the method 1200 may include the UE transmitting, to the serving base station, information associated with performing a discovery scan procedure on a second frequency in a second frequency band during a discovery scan interval. The second frequency may be different from the first frequency. The information transmitted may include an indication of the second frequency. In some examples, the discovery scan procedure may be an inter-PLMN D2D discovery scan procedure where the serving base station and the announcing UE broadcasting the discovery signal are associated with different carriers or network providers.

At block 1215, the method 1200 may include the UE identifying a capability to skip one or more downlink transmission from the serving base station during the discovery scan interval. The UE may identify the skip capability autonomously and at block 1220, tune to the second frequency during the discovery scan interval. That is, the UE may support skipping the one or more downlink transmissions during the discovery scan interval without input from the serving base station. The UE may tune a receive chain to the second frequency.

At block 1225, the method 1200 may include the UE skipping the one or more transmissions from the serving base station during the discovery scan interval. Tuning the receive chain to the second frequency may result in the UE skipping the one or more downlink transmissions from the serving base station.

The operation(s) at blocks 1205, 1210, 1215, 1220, and/or 1225 may be performed using the UE discovery manager 615 described with reference to FIGS. 6-8.

Thus, the method 1200 may provide for wireless communication. It should be noted that the method 1200 is just one implementation and that the operations of the method 1200 may be rearranged or otherwise modified such that other implementations are possible.

Figure 13:
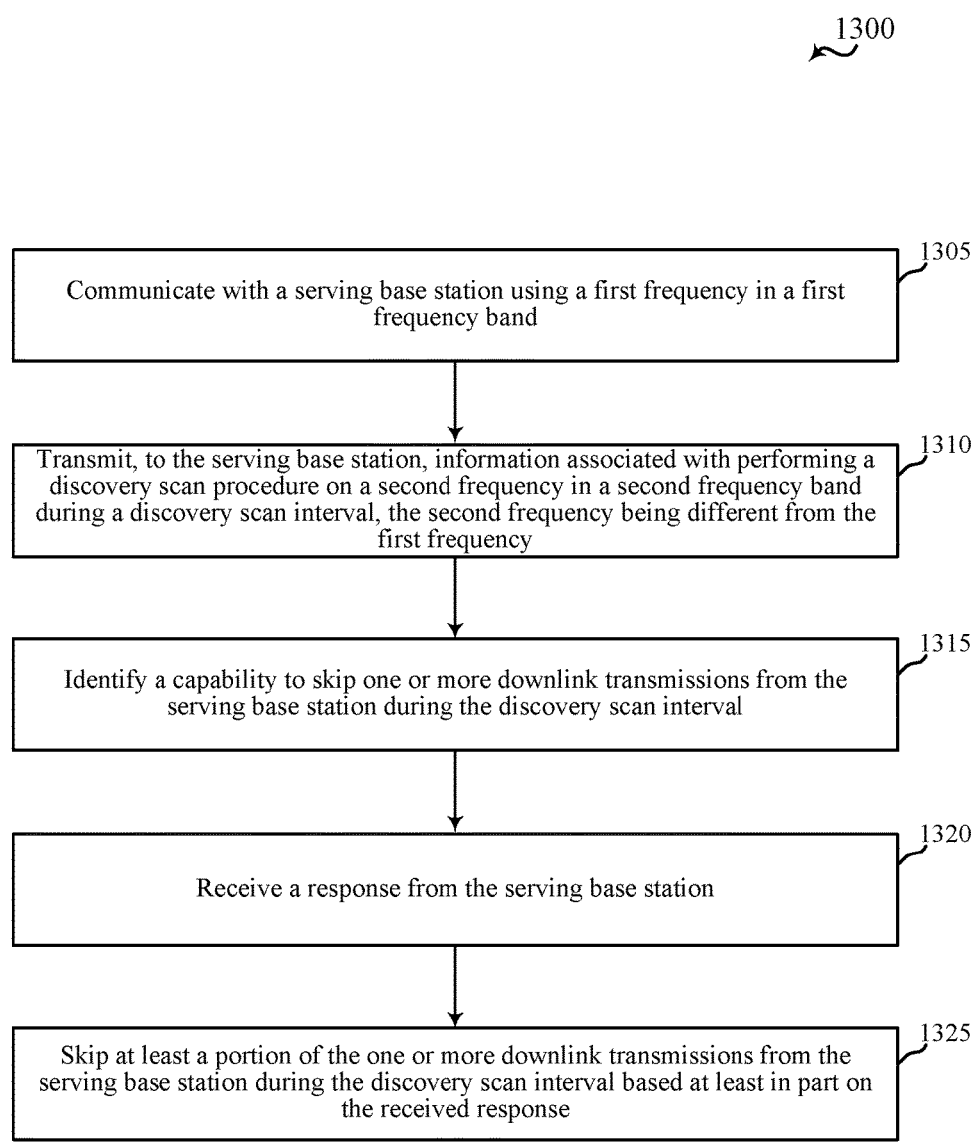
FIG. 13 is a flow chart illustrating an example of a method for wireless communication, in accordance with various aspects of the present disclosure.

FIG. 13 shows a flowchart illustrating a method 1300 for wireless communications, in accordance with various aspects of the present disclosure. The operations of method 1300 may be implemented by a UE 115 or its components, and/or by a device 605 as described with reference to FIGS. 1-8. For example, the operations of method 1300 may be performed by the UE discovery manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1300 will be described with reference to a UE, such as a monitoring UE 115.

At block 1305, the method 1300 may include the UE communicating with a serving base station using a first frequency in a first frequency range. The UE may be communicating with the serving base station during an active communication session where the UE is in an RRC_connected mode. The communication session may be associated with the UE receiving one or more downlink transmissions from the serving base station.

At block 1310, the method 1300 may include the UE transmitting, to the serving base station, information associated with performing a discovery scan procedure on a second frequency in a second frequency band during a discovery scan interval. The second frequency may be different from the first frequency. The information transmitted may include an indication of the second frequency. In some examples, the discovery scan procedure may be an inter-PLMN D2D discovery scan procedure where the serving base station and the announcing UE broadcasting the discovery signal are associated with different carriers or network providers.

At block 1315, the method 1300 may include the UE identifying a capability to skip one or more downlink transmission from the serving base station during the discovery scan interval. For example, at block 1320 the UE may receive a response from the serving base station and identify the skip capability based on the response received from the serving base station. The response may provide an indication that the UE is allowed to skip all, allowed to skip a portion of, and/or allowed to skip none of the downlink transmissions from the serving base station during the discovery scan interval. That is, the UE may support skipping the one or more downlink transmissions during the discovery scan interval based, at least in part, on input received from the serving base station.

At block 1325, the method 1300 may include the UE skipping the one or more transmissions from the serving base station during the discovery scan interval based at least in part on the received response. The response may include information indicative of which portions of the downlink transmissions can be skipped and which portions of the downlink transmissions cannot be skipped during the discovery scan interval.

The operation(s) at blocks 1305, 1310, 1315, 1320, and/or 1325 may be performed using the UE discovery manager 615 described with reference to FIGS. 6-8.

Thus, the method 1300 may provide for wireless communication. It should be noted that the method 1300 is just one implementation and that the operations of the method 1300 may be rearranged or otherwise modified such that other implementations are possible.

Figure 14:
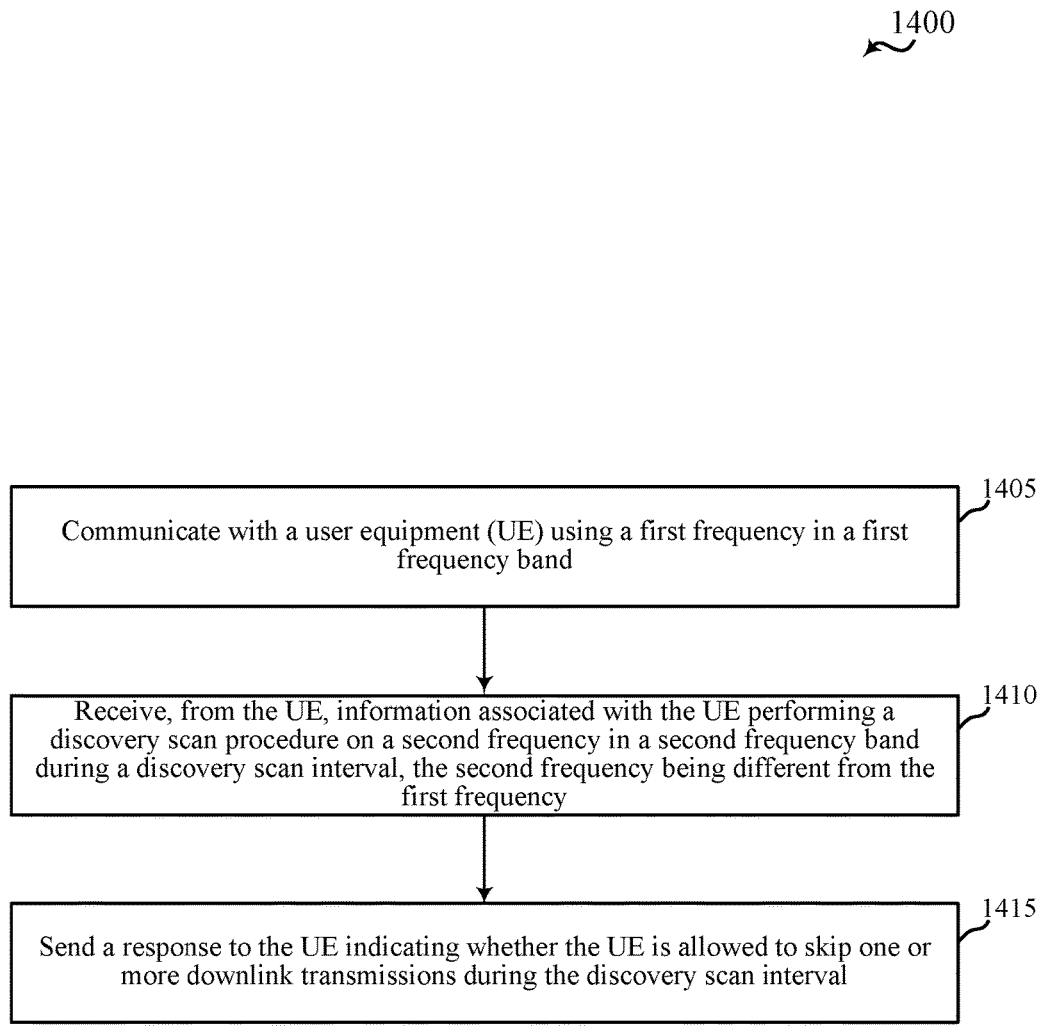
FIG. 14 is a flow chart illustrating an example of a method for wireless communication, in accordance with various aspects of the present disclosure.

FIG. 14 shows a flowchart illustrating a method 1400 for wireless communications, in accordance with various aspects of the present disclosure. The operations of method 1400 may be implemented by a base station 105 or its components, and/or by an apparatus 905 as described with reference to FIGS. 1-5 and 9-10, respectively. For example, the operations of method 1400 may be performed by the base station discovery manager 915 as described with reference to FIGS. 9-10. In some examples, a base station 105 may execute a set of codes to control the functional elements of the base station 105 to perform the functions described below. Additionally or alternatively, the base station 105 may perform aspects the functions described below using special-purpose hardware. For convenience, the functions of the method 1400 will be described with reference to a base station, such as a serving base station of a monitoring UE.

At block 1405, the method 1400 may include the base station communicating with a UE using a first frequency in a first frequency range. The base station may be communicating with the UE during an active communication session where the UE is in an RRC_connected mode. The communication session may be associated with the UE receiving one or more downlink transmissions from the base station.

At block 1410, the method 1400 may include the base station receiving, from the UE, information associated with the UE performing a discovery scan procedure on a second frequency in a second frequency band during a discovery scan interval. The second frequency may be different from the first frequency. The information received may include an indication of the second frequency. In some examples, the discovery scan procedure may be an inter-PLMN D2D discovery scan procedure where the base station and the announcing UE broadcasting the discovery signal are associated with different carriers or network providers.

At block 1415, the method 1400 may include the base station sending a response to the UE indicating whether the UE is allowed to skip one or more downlink transmissions during the discovery scan interval. For example, the base station may identify a capability of the UE to skip the one or more downlink transmission from the base station during the discovery scan interval. In a partial-skip scenario, the response may provide an indication of a first portion of downlink transmissions that can be skipped and a second portion of downlink transmissions that cannot be skipped during the discovery scan interval.

The operation(s) at blocks 1405, 1410, and/or 1415 may be performed using the base station discovery manager 915 described with reference to FIGS. 9-10.

Thus, the method 1400 may provide for wireless communication. It should be noted that the method 1400 is just one implementation and that the operations of the method 1400 may be rearranged or otherwise modified such that other implementations are possible.

In some examples, aspects from two or more of the methods 1100-1400 may be combined. It should be noted that the methods 1100, 1200, etc. are just example implementations, and that the operations of the methods 1100-1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a serving base station, comprising:
   communicating with a user equipment (UE) using a first frequency in a first frequency band;
   receiving, from the UE, information associated with the UE performing a discovery scan procedure on a second frequency in a second frequency band during a discovery scan interval, the second frequency being different from the first frequency;
   determining that the UE is allowed to tune at least one receive chain away from the first frequency to the second frequency during a first portion of the one or more downlink transmissions the UE is allowed to skip during the discovery scan interval and that the UE is allowed to retune the at least one receive chain to the first frequency during a second portion of the one or more downlink transmissions the UE is not allowed to skip during the discovery scan interval; and
   sending a response to the UE indicating whether the UE is allowed to skip one or more downlink transmissions during the discovery scan interval based at least in part on the determining, wherein the response identifies the first portion of the one or more downlink transmissions the UE is allowed to skip during the discovery scan interval, and the second portion of the one or more downlink transmissions the UE is not allowed to skip during the discovery scan interval.

2. The method of claim 1, further comprising:
   receiving a capability message from the UE indicating the UE is capable of skipping the one or more downlink transmissions during the discovery scan interval.

3. The method of claim 1, further comprising:
   receiving timing information associated with the discovery scan interval from the UE.

4. The method of claim 1, wherein the response comprises a bitmap corresponding to:
   the one or more downlink transmission the UE is allowed to skip; and
   the one or more transmissions the UE is not allowed to skip.

5. An apparatus for wireless communication, comprising:
   a processor;
   memory in electronic communication with the processor; and
   instructions stored in the memory, the instructions being executable by the processor to:
   communicate with a user equipment (UE) using a first frequency in a first frequency band;
   receive, from the UE, information associated with the UE performing a discovery scan procedure on a second frequency in a second frequency band during a discovery scan interval, the second frequency being different from the first frequency;

determine that the UE is allowed to tune at least one receive chain away from the first frequency to the second frequency during a first portion of the one or more downlink transmissions the UE is allowed to skip during the discovery scan interval and that the UE is allowed to retune the at least one receive chain to the first frequency during a second portion of the one or more downlink transmissions the UE is not allowed to skip during the discovery scan interval; and send a response to the UE indicating whether the UE is allowed to skip one or more downlink transmissions during the discovery scan interval based at least in part on the determining, wherein the response identifies the first portion of the one or more downlink transmissions the UE is allowed to skip during the discovery scan interval, and the second portion of the one or more downlink transmissions the UE is not allowed to skip during the discovery scan interval.

6. The apparatus of claim 5, further comprising instructions executable by the processor to:

receive a capability message from the UE indicating the UE is capable of skipping the one or more downlink transmissions during the discovery scan interval.

7. The apparatus of claim 5, further comprising instructions executable by the processor to:

receive timing information associated with the discovery scan interval from the UE.

8. The apparatus of claim 5, wherein the response comprises a bitmap corresponding to:

the one or more downlink transmission the UE is allowed to skip; and the one or more transmissions the UE is not allowed to skip.

9. An apparatus for wireless communication, comprising:

means for communicating with a user equipment (UE) using a first frequency in a first frequency band;

means for receiving, from the UE, information associated with the UE performing a discovery scan procedure on a second frequency in a second frequency band during a discovery scan interval, the second frequency being different from the first frequency;

means for determining that the UE is allowed to tune at least one receive chain away from the first frequency to the second frequency during a first portion of the one or more downlink transmissions the UE is allowed to skip during the discovery scan interval and that the UE is allowed to retune the at least one receive chain to the first frequency during a second portion of the one or more downlink transmissions the UE is not allowed to skip during the discovery scan interval; and means for sending a response to the UE indicating whether the UE is allowed to skip one or more downlink transmissions during the discovery scan interval based at least in part on the determining, wherein the response identifies the first portion of the one or more downlink transmissions the UE is allowed to skip during the discovery scan interval, and the second portion of the one or more downlink transmissions the UE is not allowed to skip during the discovery scan interval.

10. The apparatus of claim 9, further comprising:

means for receiving a capability message from the UE indicating the UE is capable of skipping the one or more downlink transmissions during the discovery scan interval.

11. The apparatus of claim 9, further comprising:

means for receiving timing information associated with the discovery scan interval from the UE.

12. The apparatus of claim 9, wherein the response comprises a bitmap corresponding to:

the one or more downlink transmission the UE is allowed to skip; and the one or more transmissions the UE is not allowed to skip.

13. A non-transitory computer readable medium storing code for wireless communication, the code comprising instructions executable by a processor to:

communicate with a user equipment (UE) using a first frequency in a first frequency band;

receive, from the UE, information associated with the UE performing a discovery scan procedure on a second frequency in a second frequency band during a discovery scan interval, the second frequency being different from the first frequency;

determine that the UE is allowed to tune at least one receive chain away from the first frequency to the second frequency during a first portion of the one or more downlink transmissions the UE is allowed to skip during the discovery scan interval and that the UE is allowed to retune the at least one receive chain to the first frequency during a second portion of the one or more downlink transmissions the UE is not allowed to skip during the discovery scan interval; and send a response to the UE indicating whether the UE is allowed to skip one or more downlink transmissions during the discovery scan interval based at least in part on the determining, wherein the response identifies the first portion of the one or more downlink transmissions the UE is allowed to skip during the discovery scan interval, and the second portion of the one or more downlink transmissions the UE is not allowed to skip during the discovery scan interval.

14. The non-transitory computer readable medium of claim 13, wherein the instructions are further executable by the processor to:

receive a capability message from the UE indicating the UE is capable of skipping the one or more downlink transmissions during the discovery scan interval.

15. The non-transitory computer readable medium of claim 13, wherein the instructions are further executable by the processor to:

receive timing information associated with the discovery scan interval from the UE.

16. The non-transitory computer readable medium of claim 13, wherein the response comprises a bitmap corresponding to:

the one or more downlink transmission the UE is allowed to skip; and the one or more transmissions the UE is not allowed to skip.

* * * * *